United States Patent [19]

Bosworth

[11] Patent Number: 5,511,659
[45] Date of Patent: Apr. 30, 1996

[54] COMPACT DISK RECORD PACKAGE WITH SLIDING COVER MEMBERS

[76] Inventor: John Bosworth, 601 N. Broadway, Upper Nyack, N.Y. 10960

[21] Appl. No.: 344,483

[22] Filed: Nov. 22, 1994

[51] Int. Cl.⁶ .................................................... B65D 85/57
[52] U.S. Cl. ..................... 206/308.1; 206/232; 206/307; 206/767
[58] Field of Search ............................ 206/308.1, 459.5, 206/807, 232, 45.15, 307, 45.14, 44 R; 40/340

[56] References Cited

U.S. PATENT DOCUMENTS

| | | | |
|---|---|---|---|
| 2,640,668 | 6/1953 | Schmidt | 206/45.15 |
| 4,899,875 | 2/1990 | Herr et al. | 206/308.1 |
| 5,265,721 | 11/1993 | Castritis | 206/308.1 |
| 5,383,553 | 1/1995 | Lammerant et al. | 206/807 |

FOREIGN PATENT DOCUMENTS 138380  2/1930  Switzerland ............... 206/45.15

*Primary Examiner*—Thomas P. Hilliard
*Attorney, Agent, or Firm*—H. Gibner Lehmann; K. Gibner Lehmann

[57] ABSTRACT

A package or case for a compact disk record, comprises a molded plastic nest member formed as a slab having in one side a circular recess constituting a nest formation in which the CD record fits and is placed. Two plastic cover pieces are carried on the nest member, at least one such piece being slidable between positions which either block or else provide access to the nest formation, said cover pieces have facing, opposite edges which are curved in a manner to provide easy access to the nested record. Cooperable detents on the nest member and cover pieces control the positioning of the latter. The nest member has affixed to its back a covering card with descriptive material, such card having upturned flanged edge portions which are fitted to opposite edges of the nest member and which are also capable of displaying descriptive material relating to the record. The plastic cover pieces together with a descriptive multi-page booklet which preferably has a stiff cover display sheet hold the record captive in the nest member.

20 Claims, 5 Drawing Sheets

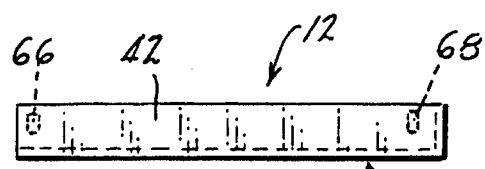
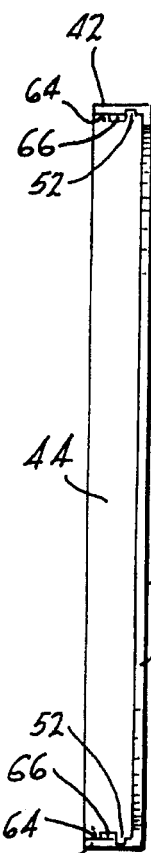
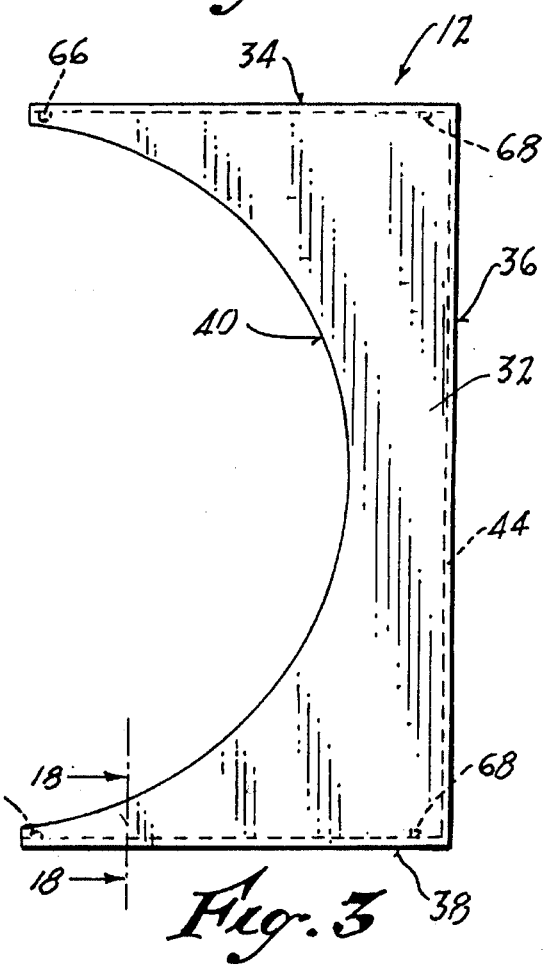
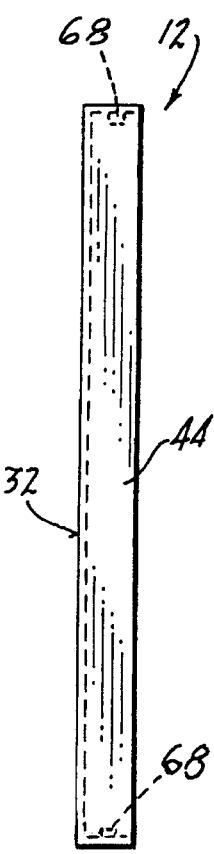
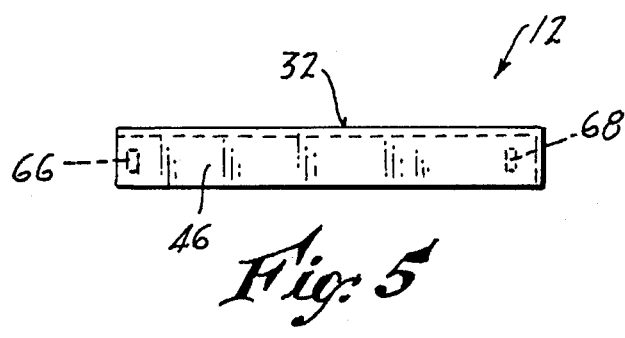

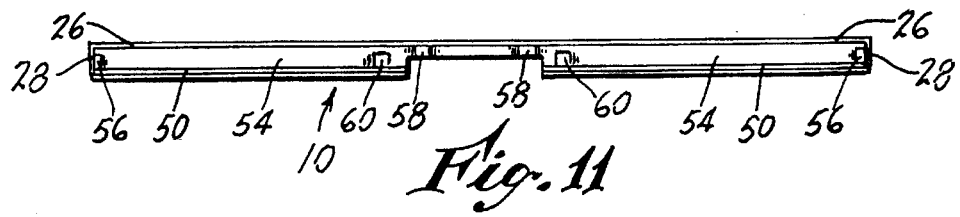
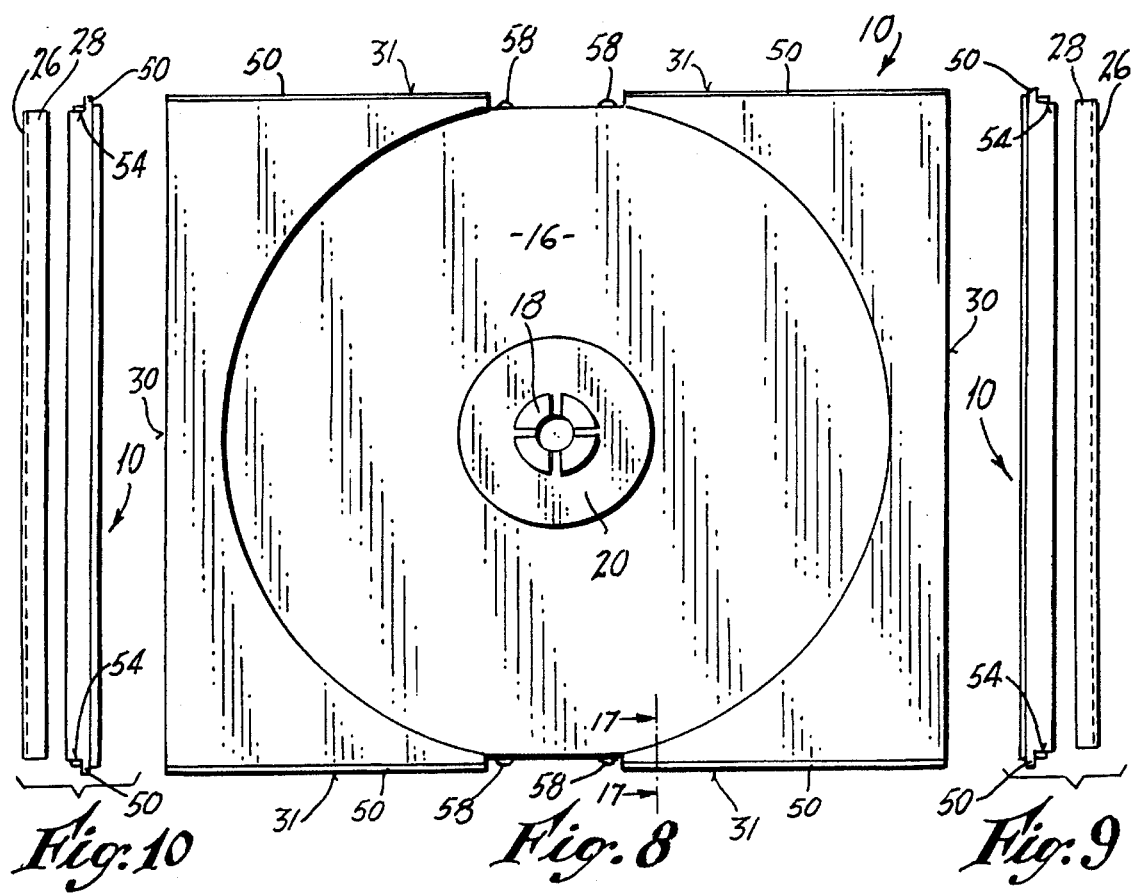
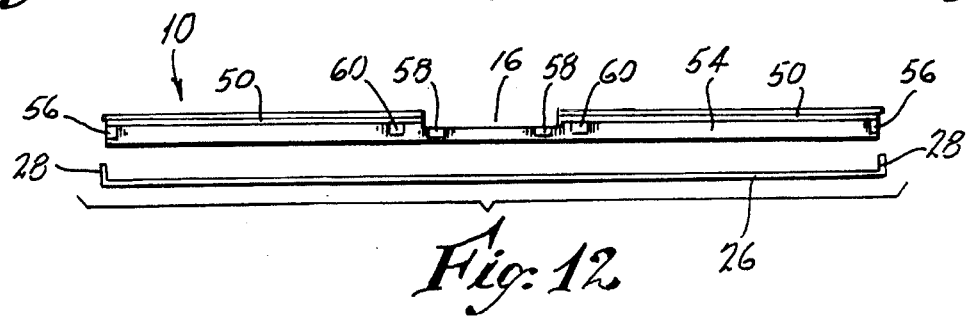

COMPACT DISK RECORD PACKAGE WITH SLIDING COVER MEMBERS

NO CROSS REFERENCES TO RELATED APPLICATIONS STATEMENT AS TO RIGHTS TO INVENTIONS MADE UNDER FEDERALLY-SPONSORED RESEARCH AND DEVELOPMENT

Research and development of the present invention and application have not been Federally-sponsored, and no rights are given under any Federal program.

BACKGROUND OF THE INVENTION

1. Field of the Invention

This invention relates to compact disk records, and more particularly to cases or packages having slideable components, which cases are intended to hold, store and display said compact disk records.

2. Description of the Related Art Including Information Disclosed Under 37 CFR §§1.97–1.99

In the past various types of containers or cases have been provided for accommodating compact disk records. One well known type of container for this purpose is commonly referred to as a "jewel case", consisting of two shallow trays connected to each other by a hinge construction. One tray is intended to hold the CD record whereas the other tray acts as a cover which can be swung open to provide access to the record, and swung closed to enclose and protect the record. This type of case had a number of drawbacks. It was relatively expensive to manufacture, as well as being subject to breakage due to the fragility of the hinge. Also, it is sometimes hard to open for a person with small hands.

To overcome these disadvantages, various types of slidable-component cases were devised, involving drawers which slid into flat enclosures that had edge openings for this purpose. One patent revealing this drawer-type case is U.S. Pat. No. 5,011,010. However, the proposed construction in this patent was still costly to produce, and had other drawbacks such as the likelihood of breakage and/or malfunction.

A sliding drawer type case is also disclosed in U.S. Pat. No. 4,463,849. The construction shown here is similarly prone to malfunction and breakage, as well as improper reassemblage of separable parts and warpage due to the thinness of plastic sections.

U.S. Pat. No. 4,609,105 discloses a sliding drawer type CD case having generally the same drawbacks as already listed above, namely high cost, lack of durability, inconvenience and likelihood to malfunction.

A hinge-and-slide type of CD case is shown in U.S. Pat. No. 5,263,580. The construction and functioning are more complex than with the above-described cases, and in consequence the likelihood of breakage and malfunction is increased, as well as the cost of producing the units.

Finally, U.S. Pat. No. Re. 33,695 reveals a hinged or jewel case type package for a CD record, having multiple components in an arrangement wherein the entire disk and case can be set into the reproducing apparatus with the disk remaining received in the case. This device also is expensive to manufacture and prone to malfunctioning or breakage when in use.

The above drawbacks and disadvantages of prior CD cases or packages, such as hinged jewel cases and the like, are obviated by the present invention, and one object of the invention is to provide a novel and improved, hingeless CD case which is especially durable and not likely to malfunction or become easily broken, as with existing hinged CD cases.

Another object of the invention is to provide an improved CD case as above set forth, which is commensurate in size with existing hinged cases so that it can be accommodated in the usual racks and CD holders now being used, to replace the present hinged jewel cases.

A further object of the invention is to provide an improved CD case in accordance with the foregoing, which can provide identification data not only on its front and back surfaces but also on its top and side edges, thereby enabling an easier and more convenient and complete cataloging and information display to be had. Presently the edge identification of jewel cases is only possible by means of a costly label application.

Yet another object of the invention is to provide an improved CD record case as above characterized, which is appreciably less costly to produce than existing cases, using less plastic material than existing cases. Less than 50% styrene is needed than with the present jewel case construction.

A still further object of the invention is to provide an improved CD case of the kind indicated, which has a uniquely shaped booklet that is presented in an attention-arresting fashion, thereby to forcefully attract the eyes of prospective customers.

A feature of the invention is the provision of an improved molded plastic CD record case as above, which requires less plastic material to produce while at the same time improving the durability of the product. It is therefore more environmentally friendly.

Other features of the invention reside in the novel CD record case wherein a descriptive booklet having a durable and decorative graphic cover sheet can be exposed to the customer's touch, said cover sheet being embossed, stamped and/or otherwise decorated all to enhance the attractiveness of the package, or alternatively wherein the booklet can be positioned behind the compact disk if it is desired to reveal the disk surface directly to view as against being covered by parts of the package.

A further object of the invention is to provide an improved CD record case as above described, which is especially easy to open and simple to operate with regard to removal and replacement of the disk and booklet, and wherein the booklet can be readily removed for inspection without in any way disturbing the CD.

Still other features of the invention reside in a hingeless CD case which has concealed nibs to control the movements of slidable cover members, a case which always can lay perfectly flat when either open or closed, a case constituted of plastic wherein some of its components are exact duplicates of each other to minimize tooling costs, wherein hidden Check-Point security labels can be pre-applied, wherein panel ornamentation of various types are economically feasible, wherein a round-shaped booklet can give a picture-frame target appearance to the package by which it stands out from the crowd, and wherein simple tamper-evident means are possible to protect the contents from being tampered with.

In accomplishing the above objects the invention basically provides, in a hingeless CD case, the combination of a plastic base in the form of a flat rectangular slab having in one side a shallow nest formation adapted to receive broadside and hold a compact disk record, a pair of plastic cover members carried by said base for disposition at one side thereof, together with cooperable slide mounting means on said base and cover members, mounting the cover members for movements in a plane, said mounting means enabling the cover members to be moved toward and away from said nest formation, and said cover members having a pair of edges that face each other in a unique arrangement wherein portions of the facing edges of the members overlie areas of the nest formation of the base when the members are closest to said formation so as to hold captive a disk record that has been previously inserted in the nest formation.

Other features and advantages will hereinafter appear.

BRIEF DESCRIPTION OF THE DRAWINGS

In the accompanying drawings:

FIG. 3 is as top plan view of one of the slide members of the CD case.

FIG. 4 is a plan view of the upper edge of the slide member of FIG. 3.

FIG. 5 is a plan view of the lower edge of the slide member of FIG. 3.

FIG. 6 is an elevational view of the inner edge of the slide member of FIG. 3.

FIG. 7 is an elevational view of the outer edge of the slide member of FIG. 3.

FIG. 8 is a top plan view of the plastic base member of the record case.

FIG. 9 is an exploded elevational view of the right edge of the plastic base member and stiff backing board adapted to be attached to the base member.

FIG. 10 is an exploded elevational view of the left edge of the plastic base member and stiff backing board.

FIG. 11 is a plan view of the top edge of the plastic base member having attached to it a stiff backing board.

FIG. 12 is an exploded plan view of the bottom edge of the plastic base member and stiff backing board adapted to be attached to the base member.

DESCRIPTION OF PREFERRED EMBODIMENT

Basically the present improved CD case or package comprises a unique combination in the form of a flat, slab-like assemblage constituted of three molded or otherwise formed plastic components which are slidably related to each other, two of said components being cover pieces and essentially duplicates of each other and the third comprising a base or base member. In addition to these, there is a descriptive backing sheet or paper board for attachment to the third or base component, and a descriptive multi-sheet booklet preferably having a stiff cover page to serve as a portion of the front of the package, at the front of the base member. If desired, an overwrap could also be used, to enclose the above entire assemblage.

Figure 1:
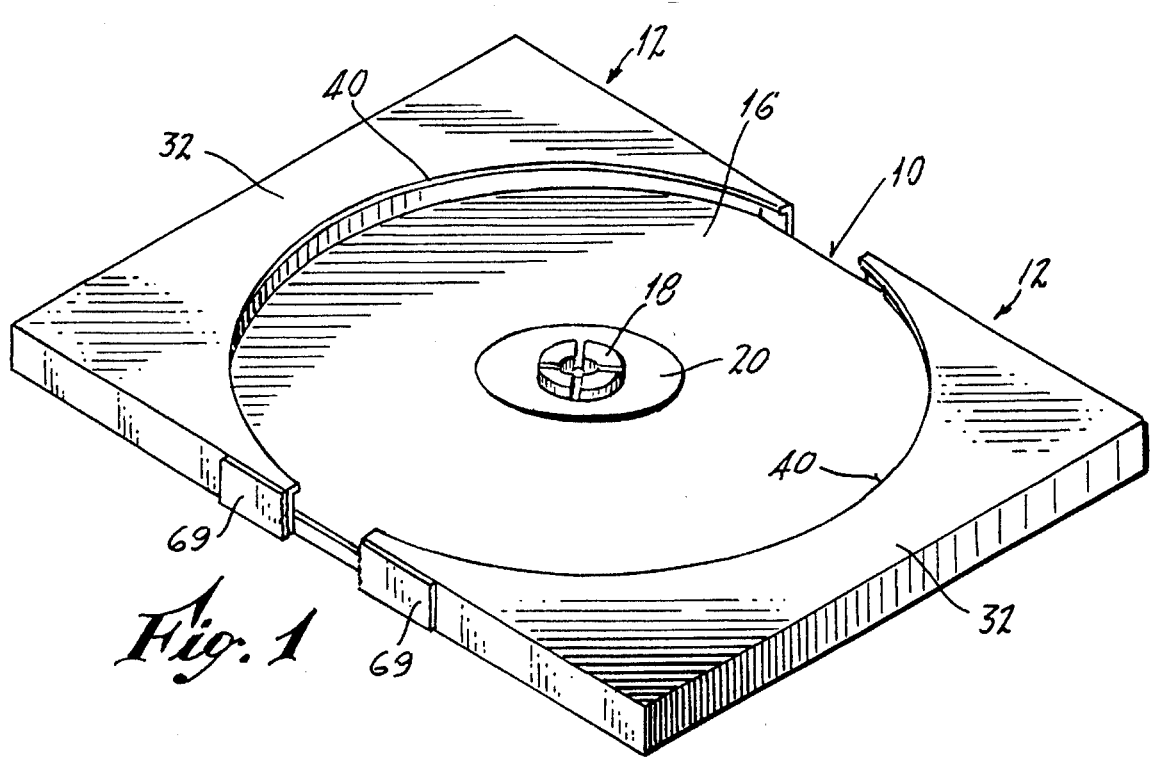
FIG. 1 is a perspective view of the improved CD record case in its open position, as provided by the invention.
Figure 2:
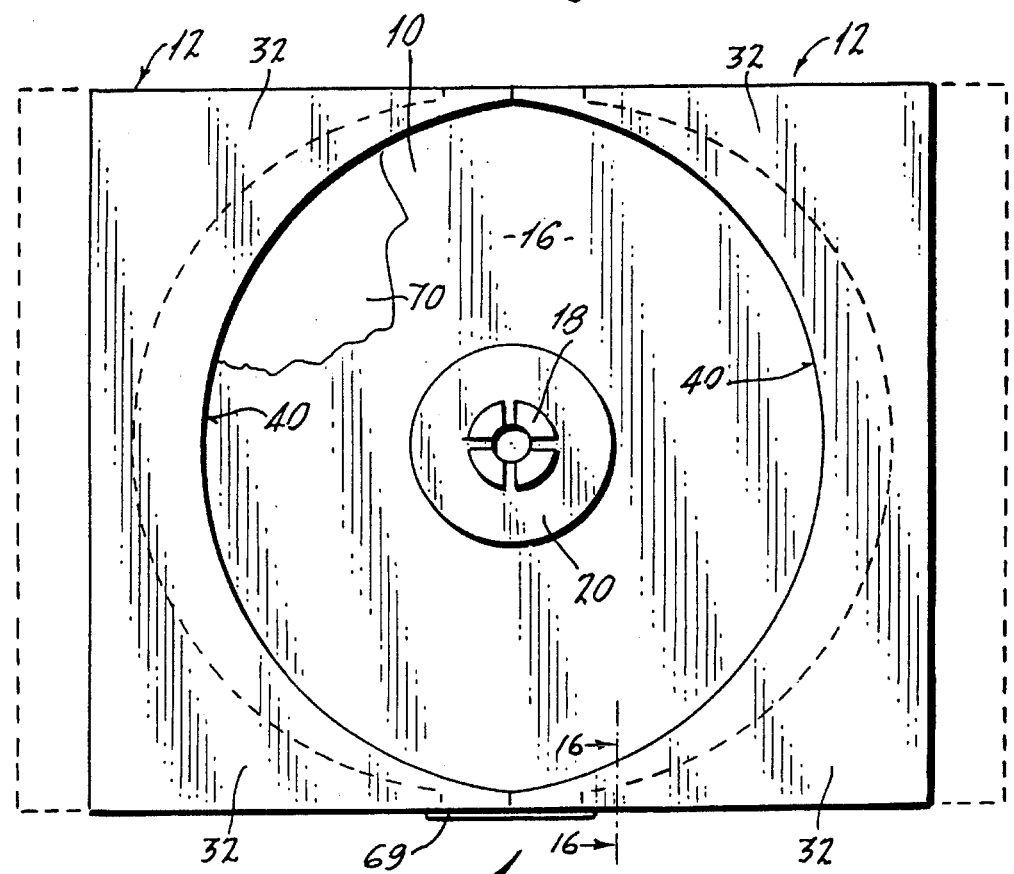
FIG. 2 is as top plan view of the CD record case, in closed position.

In accordance with the present invention and as seen in FIGS. 1 and 2, the base or base member comprises a rigid molded plastic part 10 which carries in a slidable arrangement two rigid identical plastic cover pieces 12. The base member 10, FIG. 8, is in the form of a thin, flat slab having in one side a circular recess 16 defining a nest formation in which a CD record (not shown) can be comfortably fitted. At the center of the recess 16 there is a slotted, resilient retainer boss 18 which can be frictionally received in the center hole of the CD record, thereby to mount the record against looseness.

Surrounding the boss 18 is a slightly raised portion or safety land 20 which tends to protect the undersurface of the record by spacing it from the expansive surrounding area which constitutes the remainder of the recess 16.

The base member 10 has four somewhat triangular corner portions as formed by the recess 16, which portions can be cored out at the rear or underside to reduce the amount of plastic required in forming the base member. The resulting spaces at the underside of the base mamber are covered over by a backing sheet or paper board 26, this being shown in its affixed, assembled position in FIG. 11. The board 26 is shown separately in FIGS. 9, 10 and 12. It can be constituted of 0.014" thick bleached sulphate paper stock, for example, and as shown herein it has opposite angled edge portions or flanges 28 which are folded at right angles and which fit against and are affixed to the opposite edge or end surfaces 30 of the base member 10. With such arrangement the board 26 can be pre-printed or otherwise provided with descriptive material relating to the contents of the package or case. Indicia on the flanges 28 can thus appear through two flanges 44 (later identified) of the cover pieces 12 if these latter are transparent, and can constitute an advantageous way of identifying the contents of the package.

The board or panel 26 can be constituted of thinner stock if desired. Instead of 0.014" thickness, a thickness of 0.010" or less can be employed. An easier folding of the flanges 28 of the paper board can be expected when thinner stock is employed.

In addition to the opposite edges 30 of the base member 10, the latter also has opposite edges 31, FIG. 8, which are respectively interrupted by the recess 16 as seen in FIGS. 8 and 12.

Figures 16, 17, 18:
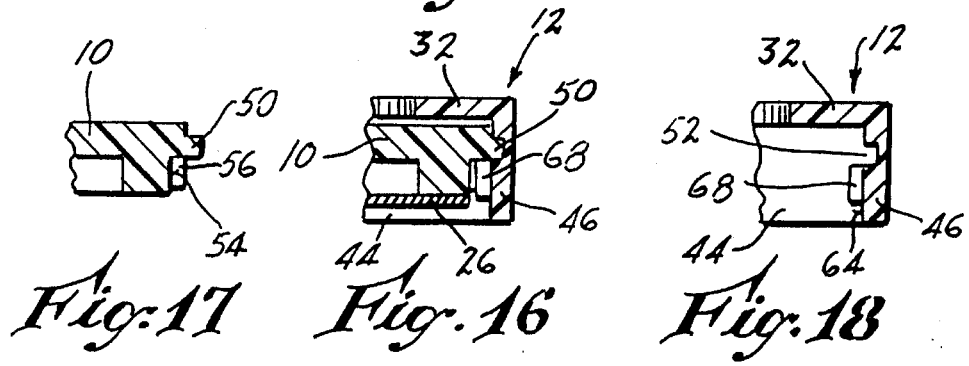
FIG. 16 is a fragmentary section of the case, taken on the line 16—16 of FIG. 2.
FIG. 17 is a fragmentary section of the base member, taken on the line 17—17 of FIG. 8.
FIG. 18 is a fragmentary section of a cover piece of the CD case, taken on the line 18—18 of FIG. 3.

Considering now the two cover members or pieces 12, since these can be identical to each other only the right-most piece 12 as viewed in FIG. 2 will be described in detail. Referring to FIGS. 3–7 the cover member or piece 12 shown therein can be economically injection molded of styrene or other suitable plastic, comprising essentially a front panel portion 32 which has somewhat of a U-shape or yoke configuration with three straight edges 34, 36 and 38, and a curved edge 40 which latter is disposed opposite the straight edge 36. The straight edges 34, 36 and 38 have narrow flanges 42, 44 and 46 respectively at the under side of the panel portion 32 as seen in FIG. 3. The flange 46 is shown in larger detail in FIGS. 16 and 18 also. The three flanges 42, 44 and 46 have the same widths as each other, and the size of the panel 32 is such that the base 10 as measured between the edges 31 can slidably snugly fit between the flanges 42 and 46.

The present invention provides a unique slidable mounting means between the cover pieces 12 and the base member 10 whereby the cover pieces can be controllably shifted from their closed disk-retaining positions shown in FIG. 2 to open positions as shown by dotted lines in FIG. 2 and full lines illustrated in FIG. 1. In such open positions, access is had to the recess 16 which defines the nest formation for the removal or replacement of a compact disk record from or to said formation. FIG. 2 shows the crescent-shaped areas of the nest formation defined by the recess 16 and delineated by the curved edges 40, for the two positions of the cover pieces 12.

In accomplishing the above, the base member 10 is provided with slide ribs 50 on the edges 31, and the cover pieces are formed with grooves 52 in the flanges 42 and 46, adapted to slidably receive the ribs 50 of the base. In addition, tracks having nibs are provided, arranged to be coextensive with the ribs and grooves.

In connection with this latter, referring to FIGS. 9–12, the base 10 has tracks 54 on its edges 31, said tracks being coextensive with the ribs 50 and having nibs 56 and 58 shown in FIGS. 11 and 12. In addition, the track 54 of FIG. 12 has special nibs 60 adjacent the nibs 58 of this figure for a purpose explained below. In FIG. 6, the cover piece 12 has tracks 64 on the flanges 42 and 46, which are coextensive with the grooves 52 in said flanges. The tracks 64 of the cover piece 12 have nibs 66 and 68 which are cooperable with the nibs 56 and 58 of the base 10.

With respect to the special nibs 60 on the lower portion of the base 10 as the base is viewed in FIG. 8, these are cooperable with the associated nibs 66 on the track 64 on the lower portion of the cover piece 12 as the cover piece is viewed in FIG. 3. Their purpose is to provide a positive stop and lock when opening the casing, so that the cover pieces 12 do not come off of the base 10.

Figure 13:
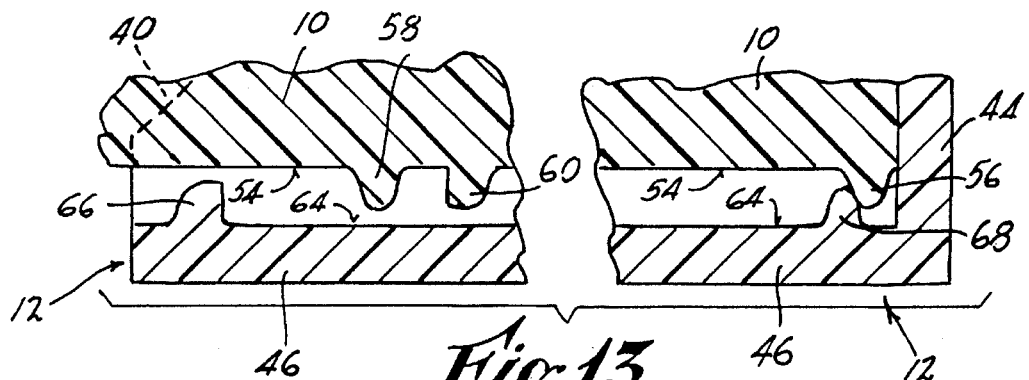
FIG. 13 is a diagrammatic representation of the cooperable detent means of the base and slide members of the CD case, depicting the closed condition of the case.
Figure 14:
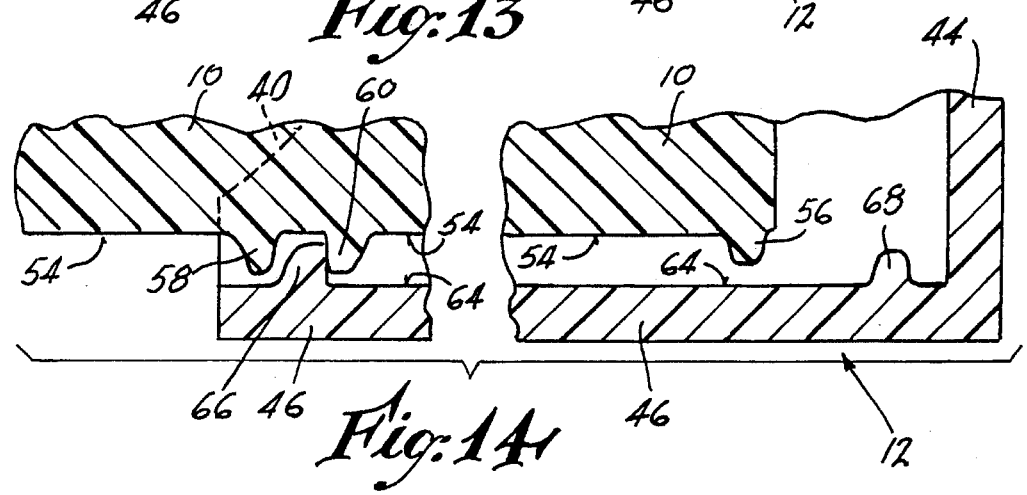
FIG. 14 is a diagrammatic representation similar to that of FIG. 13 but depicting the open condition of the case.

Reference is now made to the schematic showings of FIGS. 13 and 14, which reveal the above designated nibs and tracks and their desired locations on the components 10 and 12 of the package. The closed condition of the package as shown in FIG. 2 is represented by the showing of FIG. 13. The nibs 56 and 68 are in engagement with each other and constitute yieldable detents which normally hold the cover pieces closed. The user exerts separating pull on the cover pieces in opposite directions, thereby overcoming the restraint of the nibs 56, 68. The left-most cover piece 12 moves to the left, and the right-most cover piece 12 moves to the right, this latter piece assuming the position now shown in FIG. 14. Here the nib 66 has been forced to the right, past the nib 58 and has come to a stop in engagement with the special positive stop nib 60. Both of the cover pieces 12 can now be as shown in the dotted line positions of FIG. 2.

As seen in FIG. 2, the facing curved edges 40 of the cover pieces 12 have a larger radius than the radius of the recess 16, whereby the cover pieces need not be opened to the extent that would otherwise be required if all the radii were to be the same, in order to provide full access for the removal or replacement of the CD.

FIGS. 1 and 2 also show a tamper-evident strip 69 which has been applied to adjacent flanges 46 of the respective cover pieces 12. The strip 69 prevents opening of the package unless it is torn at the joint between the cover pieces to separate it into two parts.

Figure 15:
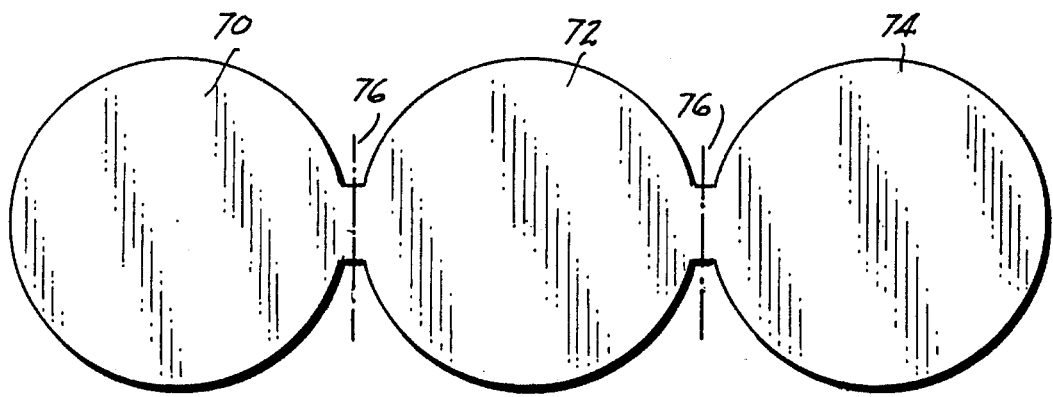
FIG. 15 is a layout of the descriptive booklet for the case, as provided by the invention.

The invention further provides a folded filler piece 70, 72, 74, shown in opened position in FIG. 15, which when folded closed fits into the recess 16 on top of the CD record, to close the space existing between the curved edges 40 of the two cover pieces. The piece can consist of multiple pages, three of which are pictured in FIG. 15. In this figure, the front or cover page is designated 70, and such page can be advantageously constituted of thicker or stiffer material such as 0.014" bleached sulphate board, if desired. The pages 70, 72 and 74 are connected along fold lines 76.

Figure 19:
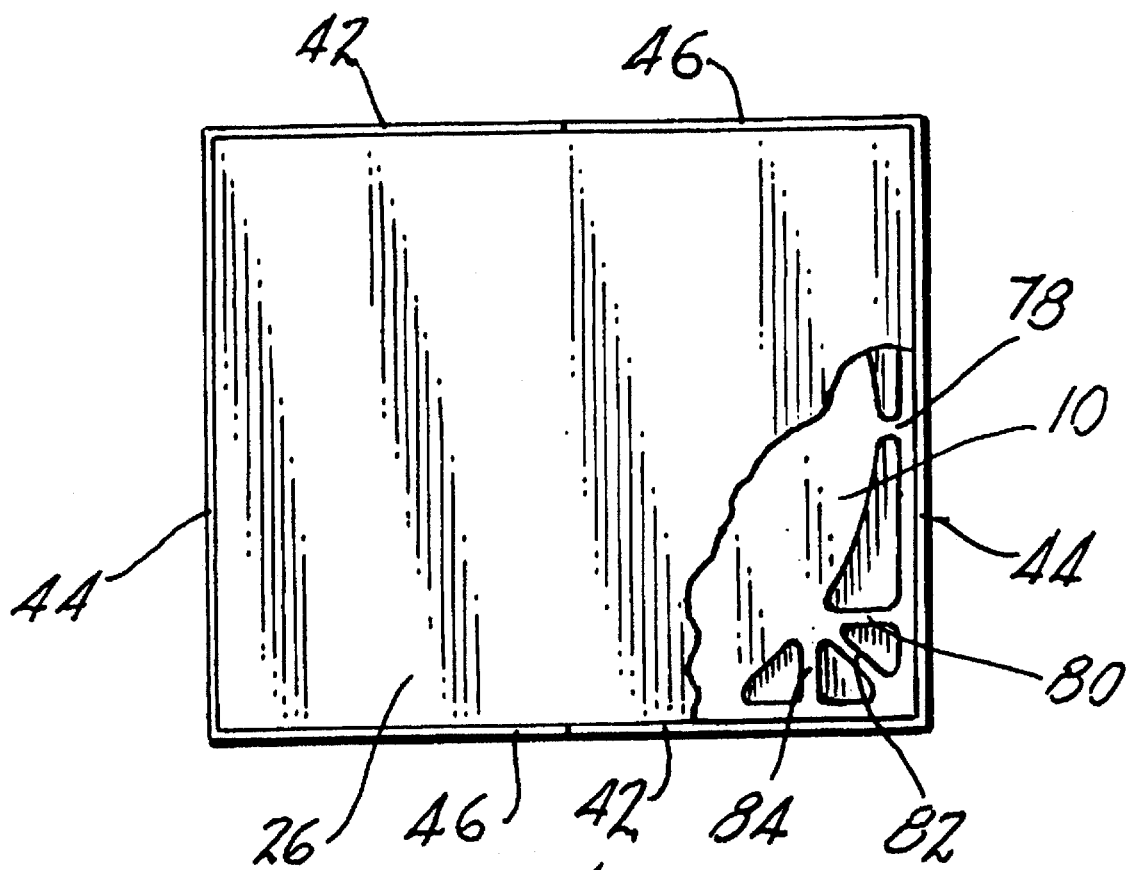
FIG. 19 is a plan view of the back of the CD case.

FIG. 19 shows the underside of the base 10, revealing the coring of the triangular corner portions thereof. The coring is arranged to provide land surfaces or lands 78, 80, 82 and 84 in the form of ribs adapted to be engaged by and adhered to the paperboard 26 so as to act as a back-up for the same.

It will now be seen that the present improved CD case has very few components which are characterized by great simplicity whereby exceptionally low manufacturing cost is achieved, without sacrificing reliability and resistance to breakage or malfunctioning. The case can be accommodated in existing racks or holders, displays etc., and has space not only on its front and back panels, but also on its top and side edges for identification and ornamentation purposes.

The pages 70–74 can be in the form of a booklet component of the package serving as part of the front panel, and can have embossing, hot stamping ornamentation, unique coloring treatment and the like to contribute to the attractiveness of the case. The circular booklet shape functions somewhat in the nature of a bull's eye, catching the eye of the prospective customer. For display purposes, the booklet can be placed in back of the CD record itself if it is desired to have the ornamentation or documentation of the actual record in full view. Substantially less plastic material is required in the producing of the case, further reducing the weight and costs, and inexpensive well-known molding techniques can be used. The booklet can be removed and inspected without disturbing in any way the CD record.

Variations and modifications of the invention are possible within the scope of the claims.

Each and every one of the appended claims represents an inventive concept complete in and of itself and is to be considered as such, when determining patentability in the light of the prior art.

I claim:

1. A case for a compact disk record, comprising in combination:

a) a base in the form of a flat rectangular slab having top and bottom sides and having in its top side a shallow nest formation to receive broadside and hold a compact disk record, b) a pair of cover members carried by the base at the said top side thereof, c) cooperable slide mounting means on said base and one of said cover members, mounting said member for movement in a plane which is common to the other of said members, said mounting means enabling said one cover member to be moved toward and away from said nest formation, d) said members having a pair of edges that face each other, e) portions of the facing edge of said one member overlying areas of the nest formation when the member is closest to said formation, thereby to hold captive a disk record that may have been previously inserted in the nest formation, f) a panel of sheet material, said panel covering and being adhered to the bottom side of the said base, g) said panel of sheet material having folded, angled end portions adapted to overlie opposite end surfaces of the said base.

2. A case for a compact disk record, comprising in combination:
   a) a base in the form of a flat rectangular slab having top and bottom sides and having in its top side a shallow nest formation to receive broadside and hold a compact disk record,
   b) a pair of cover members carried by said base at the said top side thereof,
   c) cooperable slide mounting means on said base and one of said cover members, mounting said member for movement in a plane which is common to the other of said members, said mounting means enabling said one cover member to be moved toward and away from said nest formation,
   d) said members having a pair of edges that face each other,
   e) portions of the facing edge of said one member overlying areas of the nest formation when the member is closest to said formation, thereby to hold captive a disk record that may have been previously inserted in the nest formation,
   f) slide mounting means, mounting the other of the cover members for sliding movement toward and away from said nest formation,
   g) portions of the facing edge of the other of said members overlying other areas of the nest formation when the said other member is closest to said formation,
   h) said facing edges being spaced apart and being concave in configuration,
   i) said base and said cover members having cooperable means for yieldably holding the cover members in their positions closest to the said nest formation of the base,
   j) the said cooperable means comprising tracks on the base and cover members, and cooperable nibs disposed on said tracks.

3. A case for a compact disk record, comprising in combination:
   a) a base in the form of a flat rectangular slab having top and bottom sides and having in its top side a shallow nest formation to receive broadside and hold a compact disk record,
   b) a pair of cover members carried by said base at the said top side thereof,
   c) cooperable slide mounting means on said base and one of said cover members, mounting said member for movement in a plane which is common to the other of said members, said mounting means enabling said one cover member to be moved toward and away from said nest formation,
   d) said members having a pair of edges that face each other,
   e) portions of the facing edge of said one member overlying areas of the nest formation when the member is closest to said formation, thereby to hold captive a disk record that may have been previously inserted in the nest formation,
   f) slide mounting means, mounting the other of the cover members for sliding movement toward and away from said nest formation,
   g) portions of the facing edge of the other of said members overlying other areas of the nest formation when the said other member is closest to said formation,
   h) said facing edges being spaced apart and being concave in configuration,
   i) said mounting means comprising ribs on opposite side edges of said base and grooves in said cover members, in which said ribs are received and in which they slide,
   said stop means comprising tracks on the base and cover members, and nibs disposed on said tracks.

4. A case for a compact disk record, comprising in combination:
   a) a base in the form of a flat rectangular slab having top and bottom sides and having in its top side a shallow nest formation to receive broadside and hold a compact disk record,
   b) a pair of cover members carried by said base at the said top side thereof,
   c) cooperable slide mounting means on said base and one of said cover members, mounting said member for movement in a plane which is common to the other of said members, said mounting means enabling said one cover member to be moved toward and away from said nest formation,
   d) said members having a pair of edges that face each other,
   e) portions of the facing edge of said one member overlying areas of the nest formation when the member is closest to said formation, thereby to hold captive a disk record that may have been previously inserted in the nest formation,
   f) slide mounting means, mounting the other of the cover members for sliding movement toward and away from said nest formation,
   g) portions of the facing edge of the other of said members overlying other areas of the nest formation when the said other member is closest to said formation,
   h) said facing edges being spaced apart and being concave in configuration,
   i) said mounting means comprising ribs on opposite side edges of said base, and grooves in said cover members, in which said ribs are received and slide,
   j) said base and cover members having track portions extending along and coextensive with said ribs and grooves,
   k) said base and cover members having cooperable nibs on said track portions to control the movements of the cover members.

5. A case for a compact disk record, comprising in combination:
   a) a base in the form of a flat rectangular slab having top and bottom sides and having in its top side a shallow nest formation to receive broadside and hold a compact disk record,
   b) a pair of cover members carried by said base at the said top side thereof,
   c) cooperable slide mounting means on said base and one of said cover members, mounting said member for movement in a plane which is common to the other of said members, said mounting means enabling said one cover member to be moved toward and away from said nest formation,
   d) said members having a pair of edges that face each other,
   e) portions of the facing edge of said one member overlying areas of the nest formation when the member is closest to said formation, thereby to hold captive a disk record that may have been previously inserted in the nest formation,
   f) said case further including a back panel of sheet material, said panel covering and being adhered to the bottom side of the said base,
   g) said panel having folded, angled end portions adapted to overlie opposite end surfaces of the said base.

6. A case for a compact disk record, comprising in combination:

a) a base in the form of a flat rectangular slab having top and bottom sides and having in its top side a shallow nest formation to receive broadside and hold a compact disk record, b) a pair of cover members carried by said base at the said top side thereof, c) cooperable slide mounting means on said base and one of said cover members, mounting said member for movement in a plane which is common to the other of said members, said mounting means enabling said one cover member to be moved toward and away from said nest formation, d) said members having a pair of edges that face each other, e) portions of the facing edge of said one member overlying areas of the nest formation when the member is closest to said formation, thereby to hold captive a disk record that may have been previously inserted in the nest formation, f) a panel of sheet material, said panel covering and being adhered to the bottom side of the said base, g) said nest formation of the base being circular, h) said base being rectangular and having triangular-shaped corner portions, and i) the bottoms of said corner portions of the base being cored out to decrease the plastic material that is required to mold the base.

7. A case for a compact disk record as set forth in claim 6, wherein:

a) the cored-out corner portions of the base have lands adapted to be engaged by and adhered to said panel of sheet material to act as a back-up for the panel.

8. A package for a compact disk record, comprising in combination:

a) a base in the form of a rigid flat rectangular slab having top and bottom sides and having in its top side a shallow nest formation to receive broadside and hold a compact disk record, b) a pair of separate cover members carried by said base at the said top side thereof, said members being relatively movable with respect to each other, c) cooperable slide mounting means on said base and one of said cover members, mounting said member for movement in a plane which is common to the other of said members, said mounting means enabling said one cover member to be moved toward and away from said nest formation, d) said members having a pair of arcuate edges that are coplanar and face each other, said edges together defining a circular central opening to reveal major portions of the disk record, e) portions of the said facing arcuate edge of said one member overlying crescent-shaped areas of the nest formation when the member is closest to said formation, thereby to hold captive a disk record that may have been previously inserted in the nest formation.

9. A package for a compact disk record as set forth in claim 8, and further including:

a) a panel of sheet material, said panel covering and being adhered to the bottom side of the said base.

10. A package for a compact disk record as set forth in claim 8, wherein:

a) the nest formation is substantially circular and the facing edges of the cover members are of concave configuration and have radii which are greater than the radius of the nest formation.

11. A package for a compact disk record as set forth in claim 8, wherein:

a) slide mounting means are provided, mounting the other of the cover members for sliding movement toward and away from said nest formation, b) portions of the facing edge of the other of said members overlying other areas of the nest formation when the said other member is closest to said formation, c) said facing edges being spaced apart and being concave in configuration.

12. A package for a compact disk record as set forth in claim 11, wherein:

a) said base and said cover members have cooperable means for yieldably holding the cover members in their positions closest to the said nest formation of the base.

13. A package for a compact disk record as set forth in claim 11, wherein:

a) said base and said cover member have cooperable means for yieldably holding the cover member in its position furthest from the said nest formation.

14. A package for a compact disk record as set forth in claim 13, wherein:

a) stop means are provided on the base and said cover members, limiting movement by a predetermined amount of the cover members past the said cooperable means in a direction away from the said nest formation.

15. A package for a compact disk record as set forth in claim 11, and further including:

a) a filler piece having a configuration enabling it to extend between facing edge portions of the said cover members, b) said filler piece underlying portions of the facing edges of the cover members and being retained in place thereby.

16. A package for a compact disk record as set forth in claim 15, wherein:

a) said filler piece has a stiff cover page enabling it to constitute a functional part which closes the opening between the said facing edges of the cover members.

17. A package for a compact disk record as set forth in claim 15, wherein:

a) the base has a back panel of sheet material, said panel covering and being adhered to the bottom side of the said base, b) said panel being adapted to have descriptive information imprinted thereon.

18. A package for a compact disk record as set forth in claim 8, and further including:

a) a tamper-evident frangible strip attached to said cover members and spanning the facing edges thereof, said strip when torn indicating that the case may have been opened.

19. A package for a compact disk record as set forth in claim 8, wherein:

a) said cover members comprises flat slab portions each having three edge flanges adapted to fit and engage corresponding edge portions of said base.

20. A package for a compact disk record as set forth in claim 8, wherein:

a) edges of said base have identification data relating to the compact disk.

* * * * *